US005646539A

United States Patent [19]

Codina et al.

[11] Patent Number: 5,646,539

[45] Date of Patent: Jul. 8, 1997

[54] MULTI-PURPOSE CAPACITIVE SENSOR

[75] Inventors: George Codina, North Hollywood, Calif.; Chandrasekar Ramamoorthy, Normal; Donna J. Murr, Dunlap, both of Ill.

[73] Assignee: Caterpillar Inc., Peoria, Ill.

[21] Appl. No.: 521,719

[22] Filed: Aug. 31, 1995

[51] Int. Cl.[6] .......................... G01N 27/22; G01N 11/02; G01N 15/04; G01F 1/56

[52] U.S. Cl. .......................... 324/678; 324/676; 73/53.01; 73/53.05; 73/53.07; 73/861.08

[58] Field of Search .................................... 324/663, 676, 324/678; 73/37, 53.01, 53.05, 53.07, 61.42, 61.47, 861.08, 861.41

[56] References Cited

U.S. PATENT DOCUMENTS

| | | | |
|---|---|---|---|
| 3,595,078 | 7/1971 | Beck et al. | 73/194 |
| 3,635,082 | 1/1972 | Prellwitz et al. | 73/194 |
| 3,724,474 | 4/1973 | DeVale | 324/678 X |
| 3,802,261 | 4/1974 | Zimmerman et al. | 73/194 |
| 4,074,184 | 2/1978 | Dechene et al. | 324/434 |
| 4,240,028 | 12/1980 | Davis, Jr. | 324/665 |
| 4,266,188 | 5/1981 | Thompson | 324/649 |
| 4,468,611 | 8/1984 | Tward | 324/673 |
| 4,604,904 | 8/1986 | Massen | 73/861.06 |
| 4,646,070 | 2/1987 | Yasuhara et al. | 73/53.07 X |
| 4,658,208 | 4/1987 | Lee et al. | 324/717 |
| 4,713,603 | 12/1987 | Thorn | 324/688 |
| 4,714,048 | 12/1987 | Jefferies et al. | 119/14.08 |
| 4,751,842 | 6/1988 | Ekrann et al. | 73/61.1 |
| 4,853,718 | 8/1989 | ElHatem et al. | 324/678 X |
| 4,894,604 | 1/1990 | Dowling et al. | 324/690 |
| 4,920,795 | 5/1990 | Codazzi et al. | 73/195 |
| 5,262,732 | 11/1993 | Dickert et al. | 324/663 X |
| 5,274,334 | 12/1993 | Mills | 324/678 |
| 5,347,848 | 9/1994 | Schoeffel et al. | 73/37 |
| 5,382,942 | 1/1995 | Raffa et al. | 340/457.4 |
| 5,461,321 | 10/1995 | Sanders et al. | 324/678 |
| 5,540,086 | 7/1996 | Park et al. | 73/53.05 |
| 5,554,937 | 9/1996 | Sanders et al. | 324/678 X |

OTHER PUBLICATIONS

Saloka et al. SAE Technical Paper Series – 910497 Feb. 25–Mar. 1, 1991 "A Capacitive Oil Deterioration Sensor".

*Primary Examiner*—Kenneth A. Wieder
*Assistant Examiner*—Glenn W. Brown
*Attorney, Agent, or Firm*—James R. Yee

[57] ABSTRACT

An apparatus for sensing two parameters of a hydraulic system having a hydraulic line includes a pair of electrodes contained within the line and oppositely spaced, forming a capacitor. The apparatus alternately produces first and second charging currents having first and second constant magnitudes, respectively, and charges the capacitor to respective first and second predetermined voltages. The apparatus detects the time needed to charge to the first and second predetermined voltages and produces a pulse width modulated signal having a series of alternating first and second pulses. The first and second pulses are indicative of the first and second parameters, respectively. The first pulse is defined by the time required to charge the capacitor to the first predetermined voltage. The second pulse is defined by the time required to charge the capacitor to the second predetermined voltage. The apparatus determines the two parameters as a function of the pulse width modulated signal.

8 Claims, 5 Drawing Sheets

MULTI-PURPOSE CAPACITIVE SENSOR

TECHNICAL FIELD

This invention relates generally to a multi-purpose sensor and more particularly to a capacitive sensor which detects multiple parameters of a hydraulic system.

BACKGROUND ART

In the earthmoving industry, hydraulic systems are typically used to power earthmoving machines and/or their implements. Typically various sensors may be used for different purposes in conjunction with the hydraulic system. For example, in order to more accurately control operation of the implement system, sensors may be used to measure hydraulic flow or pressure within the system. Or sensors may detect harmful metallic particles within the hydraulic fluid.

Earthmoving machines operate in a highly hostile environment. One of the problems associated with sensors in such environments is their reliability. Additionally, each sensor that is required adds additional cost and complexity to the manufacture of the system.

The present invention is directed to overcoming one or more of the problems, as set forth above.

DISCLOSURE OF THE INVENTION

In one aspect of the present invention, an apparatus for sensing two parameters of a hydraulic system having a hydraulic line is provided. The apparatus includes a pair of electrodes contained within the line and oppositely spaced, forming a capacitor. The apparatus alternately produces first and second charging currents having first and second constant magnitudes, respectively, and charges the capacitor to respective first and second predetermined voltages. The apparatus detects the time needed to charge to the first and second predetermined voltages and produces a pulse width modulated signal having a series of alternating first and second pulses. The first and second pulses are indicative of the first and second parameters, respectively. The first pulse is defined by the time required to charge the capacitor to the first predetermined voltage. The second pulse is defined by the time required to charge the capacitor to the second predetermined voltage. The apparatus determines the two parameters as a function of the pulse width modulated signal.

In another aspect of the present invention an apparatus for sensing hydraulic flow, hydraulic pressure, oil life, cavitation, and particles in a hydraulic system having a hydraulic line is provided. The apparatus includes a pair of electrodes contained within the line. The electrodes are oppositely spaced, forming a capacitor. The apparatus alternately produces first, second, third, fourth, and fifth charging currents having first, second, third, fourth and fifth constant magnitudes, respectively and charges the capacitor to respective first, second, third, fourth, and fifth predetermined voltages. The apparatus detects the elapsed time to charge the capacitor to the first, second, third, fourth, and fifth predetermined voltages and produces a pulse width modulated signal having a series of alternating first, second, third, fourth, and fifth pulses. The first, second, third, fourth, and fifth pulses are indicative of hydraulic flow, hydraulic pressure, oil life, cavitation, and the presence of particles, respectively.

BEST MODE FOR CARRYING OUT THE INVENTION

Figure 1:
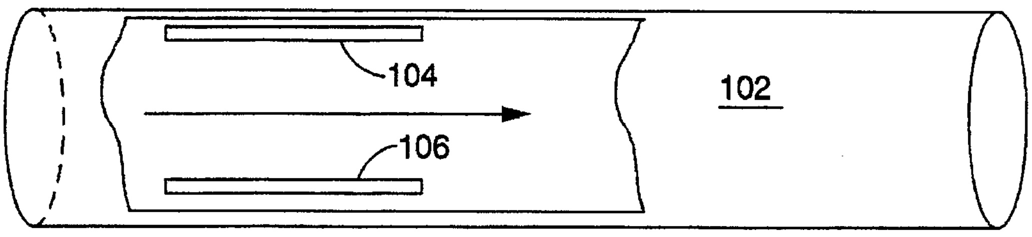
FIG. 1 is a diagrammatic view of a container for containing fluid.

With reference to FIG. 1, the present invention is adapted to detect a plurality of parameters and/or characteristics of hydraulic oil in a hydraulic system.

Figure 2:
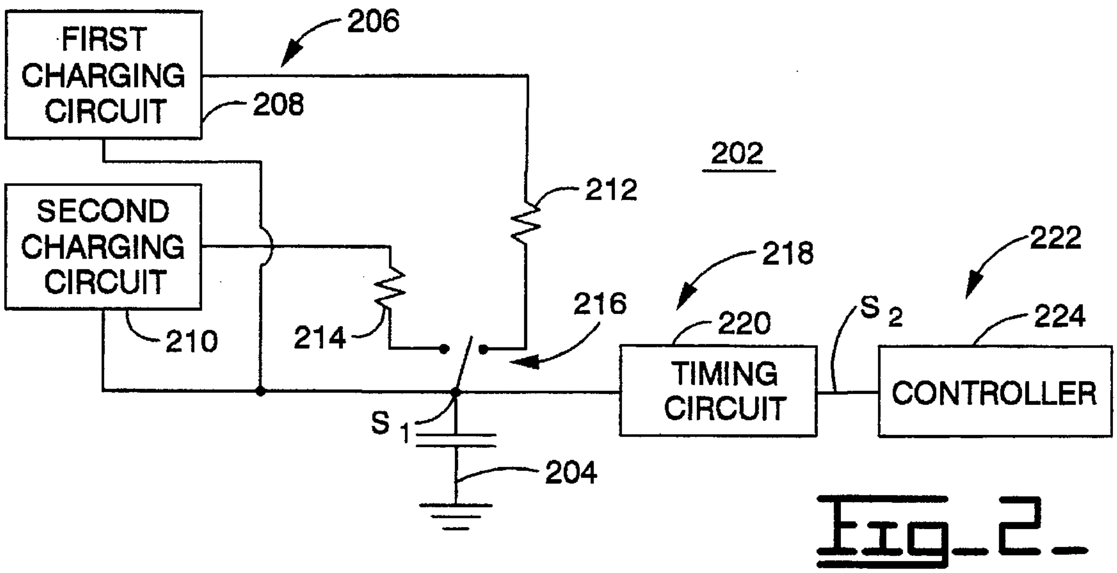
FIG. 2 is a block diagram of a multi-purpose sensor according to a first embodiment of the present invention.

With reference to FIGS. 1 and 2, the present invention, apparatus or detector 202 includes a pair of electrodes contained within a hydraulic line 102. The electrodes 104, 106 are contained within the hydraulic line 102 and are oppositely spaced so as to form a capacitor 204. Preferably, the electrodes do not obstruct fluid flow. The hydraulic fluid within the line 102 is the dielectric of the capacitor 204. The electrodes may be flat or curved and/or rectangular, triangular or otherwise shaped.

In a first embodiment, the present invention is adapted to determine at least two parameters or characteristics of the hydraulic fluid.

With reference to FIG. 2, the first embodiment includes a charging means 206 connected to the capacitor 204. The charging means 206 includes first and second charging circuits 208,210. The charging means 206 also includes a switching means 216.

In the preferred embodiment, the charging circuits 208, 210 include respective resistors 212,214 and a constant voltage source, $+V_s$.

The first and second charging circuits 208,210 produce first and second charging currents ($I_1$ and $I_2$). The first and second charging currents are preferably of constant, but different magnitudes. The first and second charging circuits 208,210 alternately charge the capacitor 204 until a predetermined voltage (V) across the capacitor is reached. Preferably, the resistors 212,214 are variable to allow for adjustment of the sensor 202. The magnitudes of the respective first and second charging currents are dependent upon the parameter being sensed and other characteristics of the hydraulic system and are set by the resistors 212,214. These values are determined experimentally.

The effects of fluid temperature variations is preferably minimized by heating the electrodes 104,106.

A timing means 218 is also connected to the capacitor 204. The timing means 218 includes a timing circuit 220. The timing circuit 220 detects the elapsed time at which the charging circuits 208,210 begin to produce the first and second charging currents and the time at which the capacitor 204 has been charged to the first and second predetermined voltages, respectively. The timing circuit 220 also produces a pulse width modulated signal. The magnitude of each pulse of the pulse width modulated signal is indicative of the elapsed time between the time at which the first and second charging circuits begin to produce the first and second charging currents, respectively, and the time at which the capacitor 204 has been charged to the first and second predetermined voltages, respectively.

Figure 3:
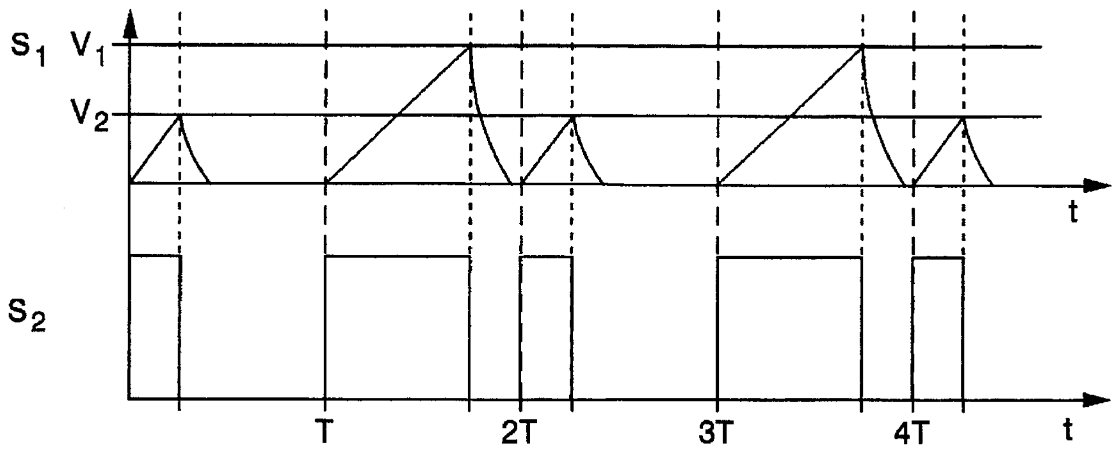
FIG. 3 is a graphical illustration of relevant signals within the multi-purpose sensor of FIG. 1.

With reference to FIG. 3, operation of the sensor according to the first embodiment with respect to the charging currents and predetermined voltages is illustrated. Charging of the capacitor 204 occurs at a preset period, T, e.g., 30 milliseconds. $S_1$ is the voltage across the capacitor 204 and $S_2$ is the output of the timing circuit 220.

In the graph of FIG. 3, the first charging circuit 208 begins to charge the capacitor 204 with the first charging current. The voltage ($S_1$) across the capacitor rises. When the capacitor 204 voltage reaches $V_1$, the first charging current is cut off and the energy stored in the capacitor 204 is allowed to dissipate. As shown in the lower half of the graph, the timing circuit 220 produces a pulse corresponding to the period of time the capacitor 204 is charging. At the beginning of the second time period, i.e., t=T, the second charging circuit 210 begins charging the capacitor 204 with the second charging current, $I_2$. The capacitor 204 is charged until the voltage across the capacitor reaches the predetermined voltage, $V_2$.

In this manner, the timing circuit 220 produces a pulse width modulated signal with pulses which contain the information necessary to determine specific parameters of the hydraulic fluid, as discussed below.

A controlling means 222 receives the pulse width modulated signal from the timing means 218 and detects/determines the first and second parameters or characteristics of the hydraulic fluid. Preferably, the controlling means 222 includes a controller 224 which preferably is microprocessor controlled.

In a second embodiment, the present invention is adapted to determine at least five parameters or characteristics of the hydraulic fluid. For example, the present invention may be used to determine: (1) flow rate, (2) pressure, and (3) remaining oil life; and to detect: (4) cavitation and (5) particles.

Figure 4:
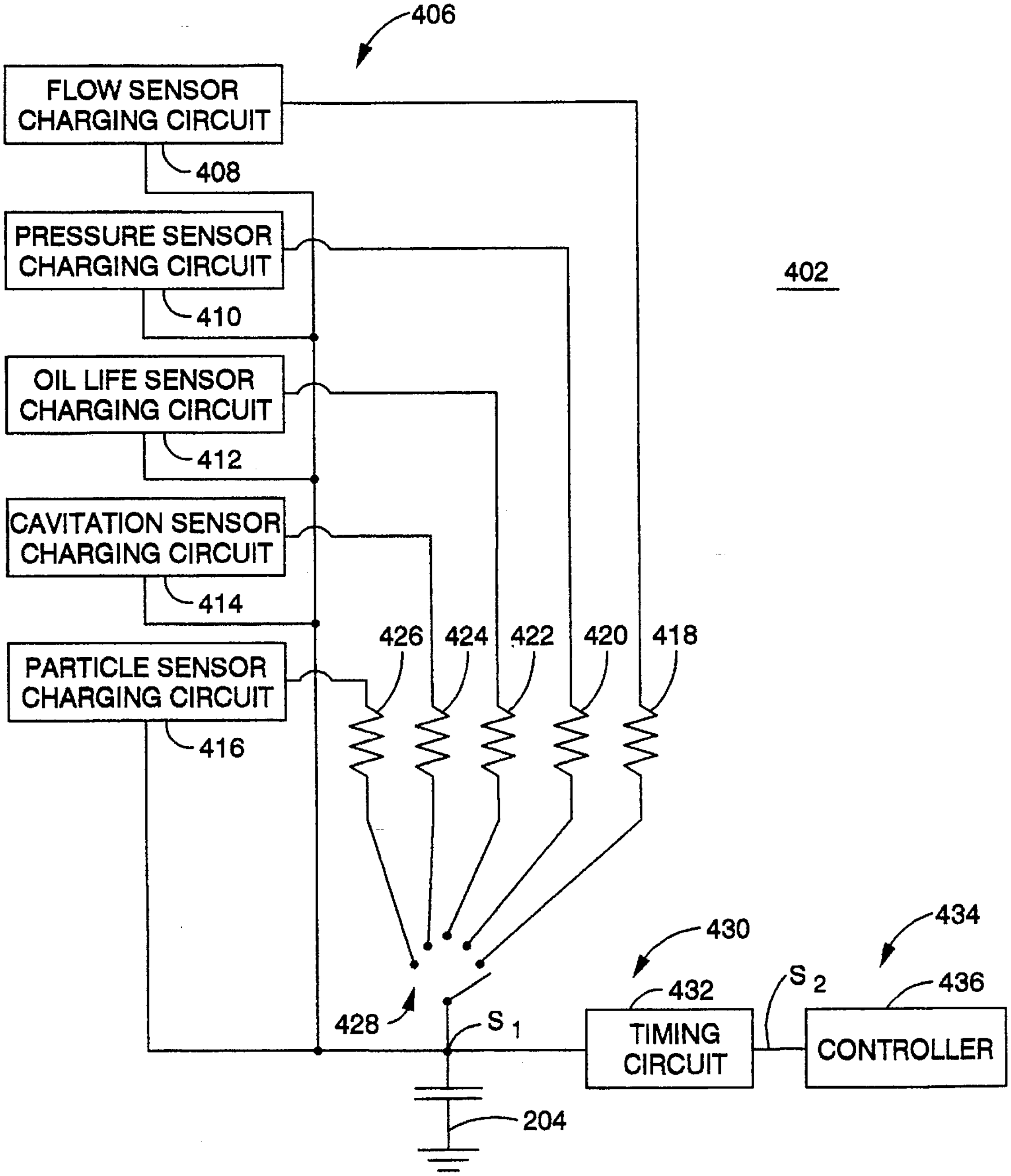
FIG. 4 is a block diagram of a multi-purpose sensor according to a second embodiment of the present invention.
Figure 5:
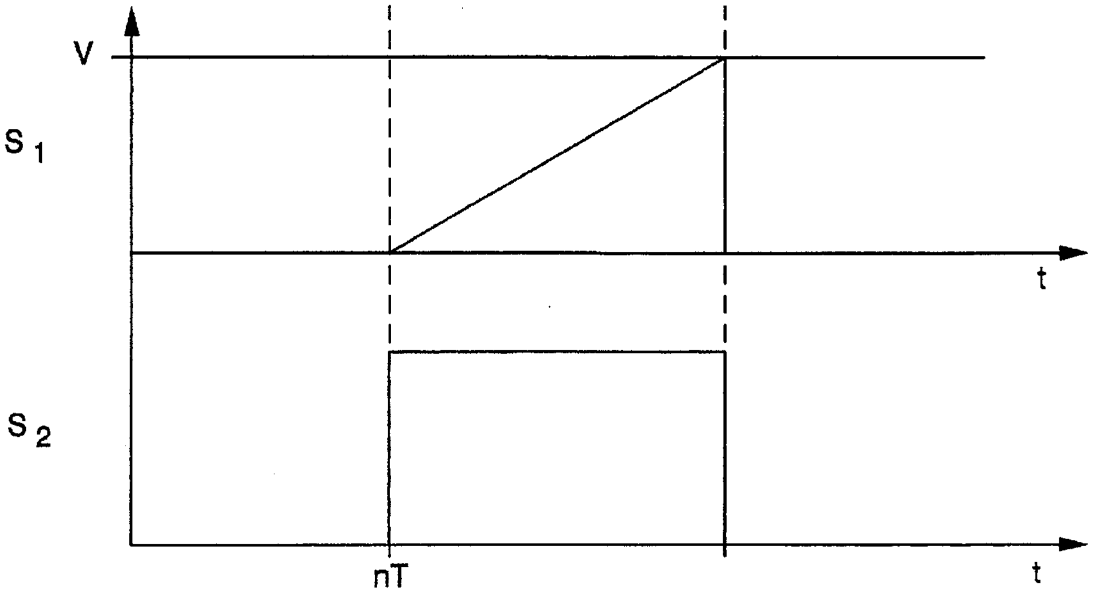
FIG. 5 is a graphical illustration of relevant signals within the multi-purpose sensor of FIG. 4.

With reference to FIGS. 4 and 5, the present invention according to the second embodiment 402 includes a charging means 406 is connected to the capacitor 204. The charging means 406 includes: a flow sensor charging circuit 408, a pressure sensor charging circuit 410, an oil life sensor charging circuit 412, a cavitation sensor charging circuit 414 and a particle sensor charging circuit 416. The charging means 406 also includes a switching means 428.

In the preferred embodiment, the charging means 406 includes respective first, second, third, fourth, and fifth resistors 418,420,422,424,426 and constant voltage source.

The charging circuits 408,410,412,414,416 produce respective first, second, third, fourth, and fifth charging currents ($I_1$, $I_2$, $I_3$, $I_4$, $I_5$). The charging currents are of constant, but not necessarily equal magnitudes. The charging circuits 408,410,412,414,416 alternately charge the capacitor 204 until the predetermined voltage ($V_n$) across the capacitor 204 is reached. Preferably, the resistors are variable to allow for adjustment of the sensor 402. The magnitudes of the first, second, third, fourth, and fifth charging currents are dependent upon the parameter being sensed and other characteristics of the hydraulic system and are set by the respective resistors 418,420,422,424,426. These values are determined experimentally.

The effects of fluid temperature variations is preferably minimized by heating the electrodes 104,106.

A timing means 430 is also connected to the capacitor 204. The timing means 430 includes a timing circuit 432. The timing circuit 432 detects the elapsed time at which the charging means 406 begins to produce the charging currents and the time at which the capacitor 204 has been charged to the predetermined voltage ($V_n$). The timing circuit 432 also produces a pulse width modulated signal. The magnitude of each pulse of the pulse width modulated signal is indicative of the elapsed time between the time at which the charging circuits 408,410,412,414,416 begin to produce the respective charging current and the time at which the capacitor 204 has been charged to the predetermined voltage ($V_n$).

In the preferred embodiment, the timing circuit 220,432 includes a MC1555 timing integrated circuit which is available from Motorola Corp., of Schaumburg Ill. The MC1555 circuit advantageously senses when the capacitor 204 has reached the predetermined voltage ($V_n$) and responsively discharges the capacitor 204 into electrical ground.

A controlling means 434 receives the pulse width modulated signal from the timing means 430 and detects/determines the respective parameter or characteristic of the hydraulic fluid. Preferably, the controlling means 434 includes a controller 436 which preferably is microprocessor controlled.

The timing circuit 220,432 of the first and second embodiments each produce a pulse width modulated signal. In order to extract information relating to the sensed parameter or characteristic, the controlling means 222,434 examines the respective pulses.

Thus in the first embodiment, the first sensed parameter or characteristic is determined using every other pulse. The second sensed parameter or characteristic is determined using the other pulses.

In the second embodiment, each pulse in the series relates to a different sensed parameter or characteristic. Thus to determine one of the parameters or characteristics, every fifth pulse is used. The next parameter or characteristic is determined by using the next pulse in a series and every subsequent fifth pulse. Thus, in each section pertaining to one parameter or characteristic, the relevant or consecutive pulses refer to the pulses used only for that parameter or characteristic. Using the relevant pulses, the controlling means 430 determines or detects the parameters or characteristics as described below.

HYDRAULIC FLUID FLOW RATE

With reference to FIG. 5, the controlling means 434 determines the hydraulic fluid flow rate as a function of the width of the pulses corresponding to the first charging current. For example, to measure flow, a range of exemplar charging currents and resistor values and a predetermined voltage are 0.2 to 1 microamps, 10–40 MOhm, and 9 volts, respectively. The charging current and predetermined voltage will vary from system to system and will be determined to minimize or eliminate the effects of other system parameters, e.g., pressure, on the charging time.

As discussed above, the flow sensor charging circuit 408 produces a first charging current. The first charging current has a constant magnitude. The flow sensor charging circuit 408 charges the capacitor 204 via the charging current until it reaches the first predetermined voltage ($V_n$=$V_1$), at which time the charging current is stopped and the energy stored in the capacitor 204 is allowed to decay.

The timing circuit 432 detects the time at which the flow sensor charging circuit 408 begins to supply the first charging current and detects the time at which the capacitor 204 has reached the first predetermined voltage level ($V_1$). Each pulse has a duration equal to the difference between the time at which the flow sensor charging circuit 408 begins to supply the charging current and the time at which the capacitor 204 has reached the predetermined voltage level ($V_1$).

If there is no flow in the fluid contained in the line 102, this difference would be constant. However, as the flow sensor charging circuit 408 provides charged particles to the fluid, a number of the particles are carried away from capacitor 204 by the hydraulic fluid flow, thus slowing the rate of charge of the capacitor 204. The greater the fluid flow, the more charged particles escape and the slower the charge time. This results in a longer pulse. Thus, the duration of each pulse is an indication of the rate of fluid flow.

For example, the pulse width output at zero (0) liters per minutes is taken as the reference in the calculation of flow rate. If the charging means 206 begins to charging at $t_1$ and reaches the predetermined voltage at $t_2$, then the output pulse width is $t_2-t_1$. When the flow rate increases, the charged molecules are carried away from the plate due to the momentum of the flow, resulting in an increase in the output pulse width. With a nonzero flow, the capacitor 204 is charged to the predetermined voltage at third, later time, $t_3$. The output pulse width is $t_3-t_1$. The difference between the increased pulse width and the reference pulse width gives a measure of the desired fluid flow rate.

HYDRAULIC FLUID PRESSURE

The controlling means 434 determines hydraulic fluid flow pressure as a function of the width of the pulses corresponding to the second charging current. For example to measure fluid pressure, an exemplar charging current, resistance value, and predetermined voltage are 9 microamps, 1 MOhms and 9 volts, respectively. The charging current will vary from system to system and will be determined to minimize or eliminate the effects of other system parameters, e.g., flow rate, on the charging time and is set by the value of the resistor 420.

As discussed above, the pressure charging circuit 410 produces a second charging current. The second charging current has a constant magnitude. The pressure sensor charging circuit 410 charges the capacitor 204 via the charging current until it reaches the second predetermined voltage ($V_n=V_2$), at which time the charging current is stopped and the energy stored in the capacitor is allowed to decay.

The timing circuit 432 detects the time at which the pressure sensor charging circuit 410 begins to supply the first charging current and detects the time at which the capacitor 204 has reached the second predetermined voltage level ($V_2$). Each pulse has a duration equal to the difference between the time at which the pressure sensor charging circuit 410 begins to supply the charging current and the time at which the capacitor 204 has reached the second predetermined voltage level ($V_2$).

REMAINING OIL LIFE

Figure 6:
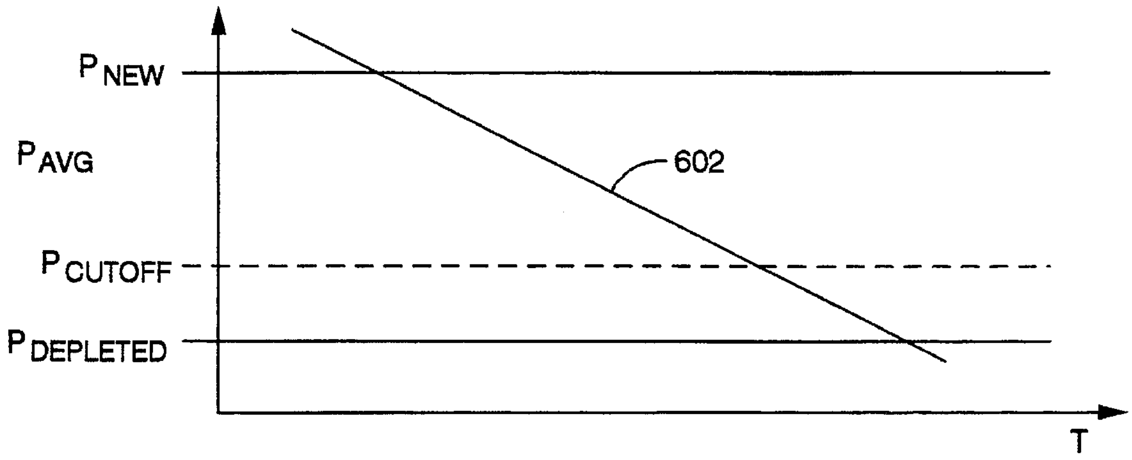
FIG. 6 is a graphical illustration of relevant signals within the multi-purpose sensor of FIG. 4.
Figure 7:
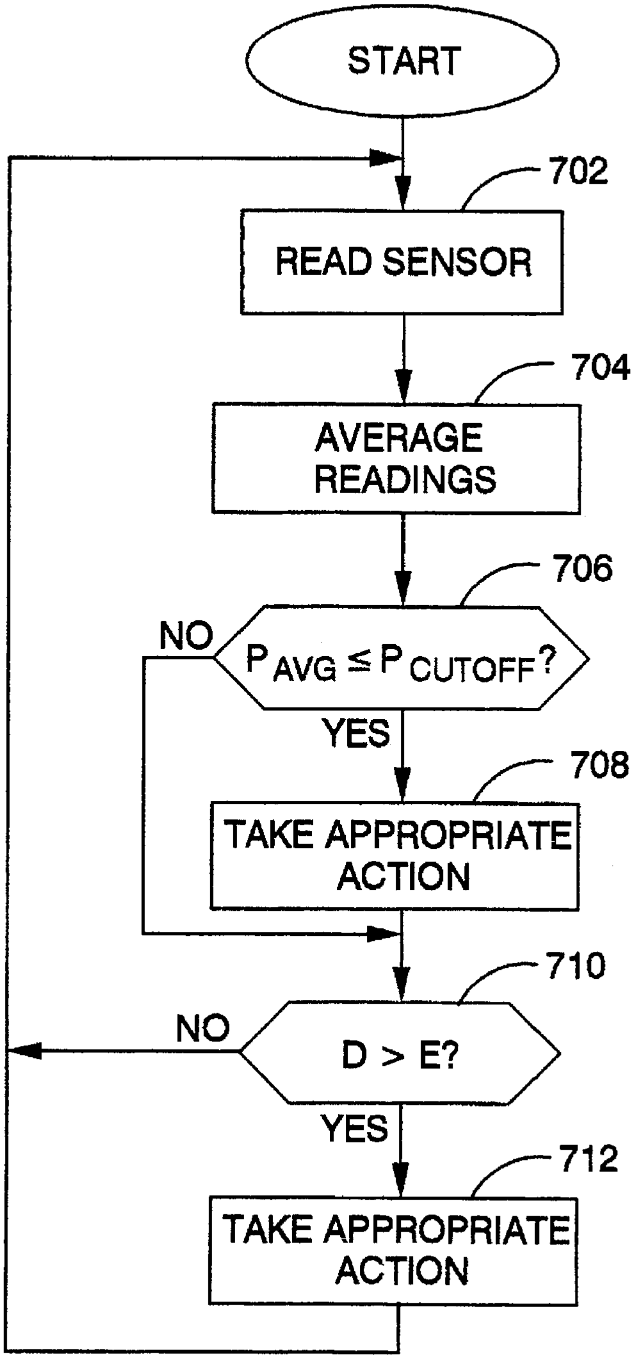
FIG. 7 is a flow diagram of the first portion of the operation of the multi-purpose sensor according to the second embodiment.

With reference to FIGS. 6 and 7, the controlling means 434 is adapted to determine or predict the life of oil in the hydraulic system by comparing the widths of the relevant pulses of the pulse width modulated signal with a reference pulse width, as discussed below. The controlling means 434 determines the oil life as a function of the width of the pulses corresponding to the third charging current. For example to measure oil life, an exemplar charging current and resistance values are 90 microamps and 100 KOhms, respectively. The charging current will vary from system to system and will be determined to minimize or eliminate the effects of other system parameters on the charging time. The charging current is set by the value of the resistor 422.

The oil life sensor charging circuit 412 is connected to the capacitor 204. The oil life sensor charging circuit 412 produces the third charging current ($I_3$), which has a constant magnitude. The third charging current charges the capacitor 204 until the third predetermined voltage ($V_n=V_3$) across the capacitor 204 is reached. Preferably, the third resistor 422 is variable to allow for adjustment of the sensor 402. The charging current and predetermined voltage will vary from system to system and will be determined to minimize or eliminate the effects of other system parameters, e.g., fluid flow, pressure, cavitation, on the charging time.

The timing circuit 432 detects the time at which the oil life sensor charging circuit 412 begins to produce the third charging current and the time at which the capacitor 204 has been charged to the third predetermined voltage ($V_3$).

Oil breakdown will cause a decrease in the pulse width over time. By averaging the pulse width (of the relevant pulses) over time and comparing the average pulse width with the reference pulse widths for new oil and completely depleted or substantially depleted oil, the oil life can be determined. Oil life may be defined as the time at which an oil change is required.

As shown in FIG. 6, the averaged pulse widths ($P_{AVG}$) from the sensor are compared with pulse width references for new oil ($P_{NEW}$) and for depleted oil ($P_{DEPLETED}$). $P_{NEW}$ and $P_{DEPLETED}$ are predetermined experimentally. The line 602 represents the expected breakdown of the oil. It should be noted that actual breakdown as represented by pulse width may not be linear. In the preferred embodiment, a cutoff value for the pulse width ($P_{CUTOFF}$) is also predetermined. Once $P_{AVG}$ reaches $P_{CUTOFF}$, an oil change is required. Thus, the controller 436 monitors $P_{AVG}$ and takes appropriate action when $P_{AVG}$ reaches $P_{CUTOFF}$.

Additionally, the controlling means 434 includes means which detects abnormal changes in the hydraulic oil, i.e., unexpected changes in the deterioration of the hydraulic oil. This is accomplished by comparing the rate of change (D) in the width of the pulses of the pulse width modulated signal with a predetermined set value (E). If the rate of change exceeds the predetermined set value (D>E), then the controlling means produces an error signal. The error signal may consist of logging the event in a memory and/or a signal to the operator via an indicator lamp.

With respect to FIG. 7, the operation of the controlling means 434 with respect to oil life will now be discussed. In a first control block 702, the sensor is read. In a second control block 704, the sensor reading is averaged with past sensor readings. If, in a first decision block 706, the average is less than or equal to $P_{CUTOFF}$, then control proceeds to a third control block 708. Otherwise, control proceeds to a second decision block 710.

In the third control block 708, the appropriate action is taken, i.e., signaling a CHANGE OIL CONDITION. Appropriate action may include activating an indicator lamp and/or recording the event in a memory.

In the second decision block 710, if D>E, then control proceeds to a fourth control block 712. Otherwise control returns to the first control block 702. In the fourth control block 712, the controlling means 434 takes the appropriate action.

CAVITATION

The controlling means 434 detects cavitation in the hydraulic system as a function of the width of the pulses corresponding to the fourth charging current. For example to detect cavitation, an exemplar charging current is 2 microamps. The charging current will vary from system to system and will be determined to minimize or eliminate the effects of other system parameters on the charging time and is set by the value of the resistor 424.

Cavitation occurs when air or vapor bubbles enter into a hydraulic system. Cavitation can seriously affect the overall reliability and life of the system and may also cause the system to become unstable, resulting in harsh or nonlinear system response.

Figure 8:
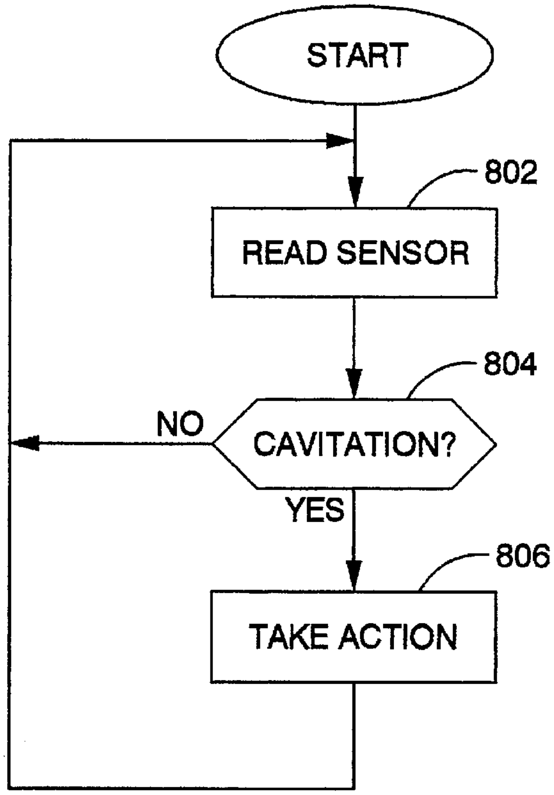
FIG. 8 is a flow diagram of the second portion of the operation of the multi-purpose sensor according to the second embodiment; and, FIG. 9 is a flow diagram of the third portion of the operation of the multi-purpose sensor according to the second embodiment.

With respect to the corresponding pulses, the controlling means 434 operates in accordance with a software control program to detect cavitation. The flowchart in FIG. 8 illustrates the operation of the control program according to one embodiment of the present invention.

In a first control block 802, the sensor is read. In a decision block 804, the last M pulses are used to determine if cavitation exists within the hydraulic system. In the preferred embodiment, cavitation is said to exist if the width of N of the last M pulses are not substantially equal to the width of a reference pulse. If cavitation is found in the decision block 804, then control proceeds to a second control block 806. Otherwise, control returns to the first control block 802.

In the second control block 806, appropriate action is taken, i.e., cavitation is stored as an event in a memory and/or an indicator lamp is lit.

The existence of air and/or vapor bubbles within the system will decrease or increase the charging rate and thus increase or decrease the pulse width relative to the reference pulse.

The duration of each pulse is compared to the reference duration. The controlling means 434 detects cavitation if N out of M pulses vary from the reference by X%. For example, if the reference duration is 1 millisecond and if out of 6 pulses in a row, 5 vary from the reference by at least 10% (0.9 ms) then cavitation exists. If cavitation is detected, the controller 436 may log the condition in a memory and/or signal an operator via an indicator light.

PARTICLE DETECTION

The controlling means 434 detects contamination of the system by ferrous particles or chips. Chips are small metallic particles which originate through the normal operation of the system. When chipping becomes extensive, it can seriously affect the overall reliability and life of the system. Extensive chipping may also be an indication of other serious problems in the system. The controlling means 434 detects particles as a function of the width of the pulses corresponding to the fifth charging current. For example to detect particles, an exemplar charging current is 1.3 microamps. The charging current will vary from system to system and will be determined to minimize or eliminate the effects of other system parameters on the charging time. The charging current is set by the value of the resistor 426.

Figure 9:
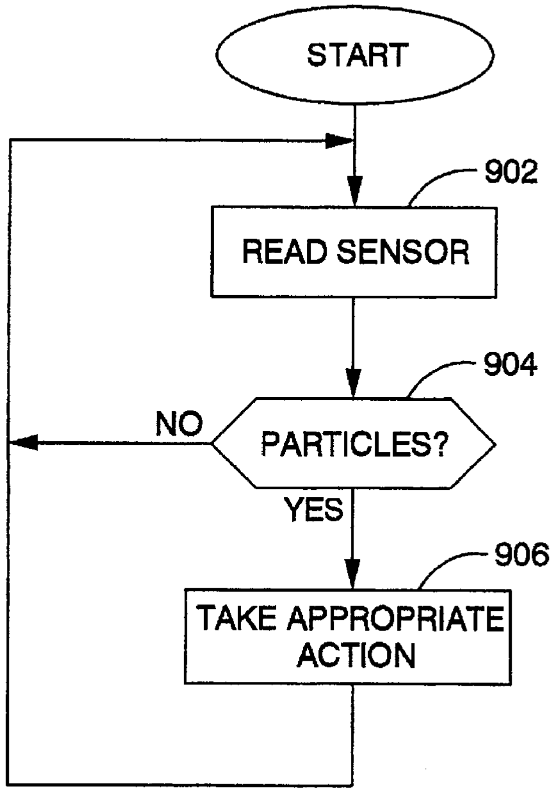

With reference to FIG. 9 in the preferred embodiment, the controlling means 434 with respect to detecting particles operates in accordance with a software control program. The flowchart in FIG. 9 illustrates the operation of the control program according to one embodiment of the present invention.

In a first control block 902, the sensor is read. In a decision block 904, the last M pulses are used to detect particles within the hydraulic system. In the preferred embodiment, particles are said to be present if the width of N of the last M pulses vary substantially from the width of the reference pulse. If particles are found to be present, control proceeds to a second control block 906. Otherwise, control returns to the first control block 902.

In the second control block 906, appropriate action is taken, i.e., detection of particles is stored as an event in a memory and/or an indicator lamp is lit.

The existence of ferrous particles within the system will decrease or increase the charging rate and increase or decrease the pulse width relative to the reference pulse. The duration of each pulse is compared to the reference duration. The controlling means 432 detects cavitation if N out of M pulses vary from the reference by X%. For example, if the reference duration is 100 microseconds and if out of 6 pulses in a row, 5 vary from the reference by at least 90% (pulse duration ≦20 microseconds) then particles are said to exist within the system. If particles are detected, the controller may log the condition in a memory and/or signal an operator via an indicator light.

INDUSTRIAL APPLICABILITY

With reference to the Figs. and in operation, the present invention or sensor 202,402 is adapted to determine or detect multiple parameters or characteristics of the hydraulic fluid in a hydraulic system.

The operation of the sensor 202,402 is discussed below. A charging means 206,406 produces a number of charging currents, having constant, but not necessarily equal magnitudes. For each parameter or characteristic to be determined, a different charging current is produced. The charging currents alternately charge the capacitor 204 until a respective charging voltage is reached. The magnitudes of the charging currents and voltages are dependent upon the parameter or characteristic being sensed. This allows the effects of other characteristics on the one parameter being sensed to be minimized.

The timing means 218,430 produces a pulse width modulated signal having a series of pulses. The series of pulses includes a pulse corresponding to each parameter or characteristic being sensed. The controlling means 222, 434 determines or detects (as discussed above) each parameter or characteristic by isolating the pulses relevant for each parameter or characteristic.

Other aspects, objects, and features of the present invention can be obtained from a study of the drawings, the disclosure, and the appended claims.

We claim:

1. An apparatus for sensing two parameters of a hydraulic system having a hydraulic line, comprising:

a pair of electrodes contained within the line and being oppositely spaced, forming a capacitor;

charging means, coupled to said capacitor for alternately producing first and second charging currents having first and second constant magnitudes, respectively, and charging said capacitor to first and second predetermined voltages, respectively;

timing means, connected to said capacitor, for detecting the time at which said charging means begins to produce said first and second charging currents and the time at which said capacitor has been charged to said first and second predetermined voltages, and for producing a pulse width modulated signal having a series of alternating first and second pulses, said first and second pulses being indicative of the first and second parameters, respectively, said first pulses being defined by the start of said first charging current and the time at which said capacitor has been charged to said first predetermined voltage, said second pulses being defined by the start of said second charging current and the time at which said capacitor has been charged to said second predetermined voltage; and, controlling means for receiving said pulse width modulated signal and responsively determining the two parameters.

2. An apparatus, as set forth in claim 1, wherein one of said first and second parameters is flow of hydraulic fluid within the hydraulic line.

3. An apparatus, as set forth in claim 1, wherein one of said first and second parameters is pressure of hydraulic fluid within the hydraulic line.

4. An apparatus, as set forth in claim 1, wherein one of said first and second parameters is oil life.

5. An apparatus, as set forth in claim 1, wherein one of said first and second parameters is the condition of cavitation.

6. An apparatus, as set forth in claim 1, wherein one of said first and second parameters is the presence of particles in the hydraulic fluid within the hydraulic line.

7. An apparatus for sensing hydraulic flow and pressure of a hydraulic system having a hydraulic line, comprising:

a pair of electrodes contained within the line and being oppositely spaced, forming a capacitor;

charging means, coupled to said capacitor for alternately producing first and second charging currents having first and second constant magnitudes, respectively, and charging said capacitor to first and second predetermined voltages, respectively;

timing means, connected to said capacitor, for detecting the time at which said charging means begins to produce said first and second charging currents and the time at which said capacitor has been charged to said first and second predetermined voltages and for producing a pulse width modulated signal having a series of alternating first and second pulses, said first and second pulses being indicative of the flow and pressure, respectively, said first pulses being defined by the start of said first charging current and the time at which said capacitor has been charged to said first predetermined voltage, said second pulses being defined by the start of said second charging current and the time at which said capacitor has been charged to said second predetermined voltage; and, controlling means for receiving said pulse width modulated signal and responsively determining hydraulic flow and pressure.

8. An apparatus for sensing hydraulic flow, hydraulic pressure, oil life, cavitation, and particles in a hydraulic system having a hydraulic line, comprising:

a pair of electrodes contained within the line and being oppositely spaced, forming a capacitor;

charging means, coupled to said capacitor for alternately producing first, second, third, fourth, and fifth charging currents having first, second, third, fourth and fifth constant magnitudes, respectively, and for charging said capacitor to respective first, second, third, fourth, and fifth predetermined voltages;

timing means, connected to said capacitor, for detecting the time at which said charging means begins to produce said first, second, third, fourth, and fifth charging currents and the time at which said capacitor has been charged to said first, second, third, fourth, and fifth predetermined voltages and for producing a pulse width modulated signal having a series of alternating first, second, third, fourth, and fifth pulses, said first, second, third, fourth, and fifth pulses being indicative of hydraulic flow, hydraulic pressure, oil life, cavitation, and the presence of particles, respectively, said first pulses being defined by the start of said first charging current and the time at which said capacitor has been charged to said first predetermined voltage, said second pulses being defined by the start of said second charging current and the time at which said capacitor has been charged to said second predetermined voltage, said third pulses being defined by the start of said third charging current and the time at which said capacitor has been charged to said third predetermined voltage, said fourth pulses being defined by the start of said fourth charging current and the time at which said capacitor has been charged to said fourth predetermined voltage, said fifth pulses being defined by the start of said fifth charging current and the time at which said capacitor has been charged to said fifth predetermined voltage; and, controlling means for receiving said pulse width modulated signal and responsively determining hydraulic flow, hydraulic pressure, oil life, cavitation and the presence of particles.

* * * * *